(12) United States Patent
Faruque et al.

(10) Patent No.: US 9,415,810 B2
(45) Date of Patent: Aug. 16, 2016

(54) VEHICLE ROOF STRUCTURE INCLUDING A CAST NODE

(71) Applicant: Ford Global Technologies, LLC, Dearborn, MI (US)

(72) Inventors: Mohammed Omar Faruque, Ann Arbor, MI (US); Fubang Wu, Troy, MI (US); Jacob Wesley Zindel, Ann Arbor, MI (US); Mei Li, Canton, MI (US); Yijung Chen, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 328 days.

(21) Appl. No.: 14/144,888

(22) Filed: Dec. 31, 2013

(65) Prior Publication Data

US 2015/0183471 A1 Jul. 2, 2015

(51) Int. Cl.
  *B62D 25/04* (2006.01)
  *B62D 25/06* (2006.01)
  *B62D 27/02* (2006.01)

(52) U.S. Cl.
  CPC .............. *B62D 27/023* (2013.01); *B62D 25/04* (2013.01); *B62D 25/06* (2013.01); *Y10T 29/49622* (2015.01)

(58) Field of Classification Search
  CPC ........ B62D 25/02; B62D 25/04; B62D 25/06; B62D 27/023
  USPC ............. 296/187.12, 187.13, 193.05, 193.06, 296/193.03, 203.01, 203.03, 210, 29, 30
  See application file for complete search history.

(56) References Cited

U.S. PATENT DOCUMENTS

| | | | | |
|---|---|---|---|---|
| 5,226,696 A * | 7/1993 | Klages | ................. | B62D 23/005 296/203.01 |
| 5,767,476 A * | 6/1998 | Imamura | ................ | B23K 11/11 219/117.1 |
| 6,010,155 A * | 1/2000 | Rinehart | ................ | B62D 21/02 288/781 |
| 6,010,182 A * | 1/2000 | Townsend | .............. | B62D 21/12 296/191 |
| 6,470,990 B1 * | 10/2002 | Panoz | .................... | B62D 23/00 180/311 |
| 6,623,067 B2 | 9/2003 | Gabbianelli et al. | | |
| 6,648,403 B2 | 11/2003 | Hanyu | | |
| 7,001,097 B2 * | 2/2006 | Wang | ................... | B62D 25/025 296/193.06 |

(Continued)

FOREIGN PATENT DOCUMENTS

EP 1927534 A1 6/2008

OTHER PUBLICATIONS

Hotform Blanks: MBW 1500/MHZ 340 B-pillar with varying thickness, 2 Pages, ThyssenKrupp Tailored Blanks GmbH, 2004.

(Continued)

*Primary Examiner* — Gregory Blankenship
(74) *Attorney, Agent, or Firm* — Damian Porcari; Law Firm of Dr. Junqi Hang, PLC

(57) ABSTRACT

The present invention in one or more embodiments provides a vehicle roof structure which includes a cast node including a pillar portion for receiving a pillar and a roof-rail portion for receiving a roof rail, the roof-rail portion having first and second ends, which may have a closed first cross-section and a closed second cross-section, respectively. The closed first cross-section may be different from the closed second cross-section such that the first and second ends are to receive two individual roof rails of different dimensions. The closed first cross-section may be larger in opening dimension than the closed second cross-section, when the first end is positioned closer to a front of the vehicle than the second end.

20 Claims, 3 Drawing Sheets

(56) References Cited

U.S. PATENT DOCUMENTS

| | | | | |
|---|---|---|---|---|
| 7,293,823 B2* | 11/2007 | Chen | ...................... | B62D 25/06 296/193.06 |
| 7,322,106 B2* | 1/2008 | Marando | .............. | B22D 19/045 29/507 |
| 7,431,378 B2* | 10/2008 | Chen | ...................... | B62D 25/06 296/102 |
| 7,484,298 B2* | 2/2009 | Mellas | .................. | B21C 37/065 29/421.1 |
| 7,503,623 B2* | 3/2009 | Favaretto | ............. | B62D 23/005 280/798 |
| 7,883,142 B2 | 2/2011 | Hosaka et al. | | |
| 8,033,595 B2* | 10/2011 | Orii | ........................ | B62D 33/06 280/801.1 |
| 8,317,253 B2 | 11/2012 | Sachdev et al. | | |
| 8,439,432 B2* | 5/2013 | Nusier | .................. | B62D 25/06 296/193.06 |
| 8,491,047 B1* | 7/2013 | Moll | ...................... | B62D 25/04 296/193.06 |
| 8,678,484 B2* | 3/2014 | Shono | .................... | B62D 25/04 296/193.06 |
| 8,820,813 B2* | 9/2014 | Wada | .................... | B62D 21/00 29/897.2 |
| 2002/0050064 A1* | 5/2002 | Furuse | ................. | B62D 23/005 29/897.2 |
| 2004/0232686 A1* | 11/2004 | Locke | .................. | B62D 23/005 280/781 |
| 2006/0064874 A1* | 3/2006 | Bonnville | ............. | B23P 11/005 29/897 |
| 2008/0122203 A1* | 5/2008 | Steinbach | .............. | B60N 3/026 280/728.2 |
| 2012/0313400 A1 | 12/2012 | Balzer et al. | | |
| 2014/0300126 A1* | 10/2014 | Ehrlich | .................. | B62D 27/02 296/29 |
| 2015/0183471 A1* | 7/2015 | Faruque | ............... | B62D 27/023 29/897.2 |

OTHER PUBLICATIONS

Audi Collision Frame Technology Guide, pp. 1-29, Audi of America, Inc., 2011.

The Aluminum Automotive Manual, Manufacturing—Casting methods, pp. 1-82, European Aluminum Association, 2002.

* cited by examiner

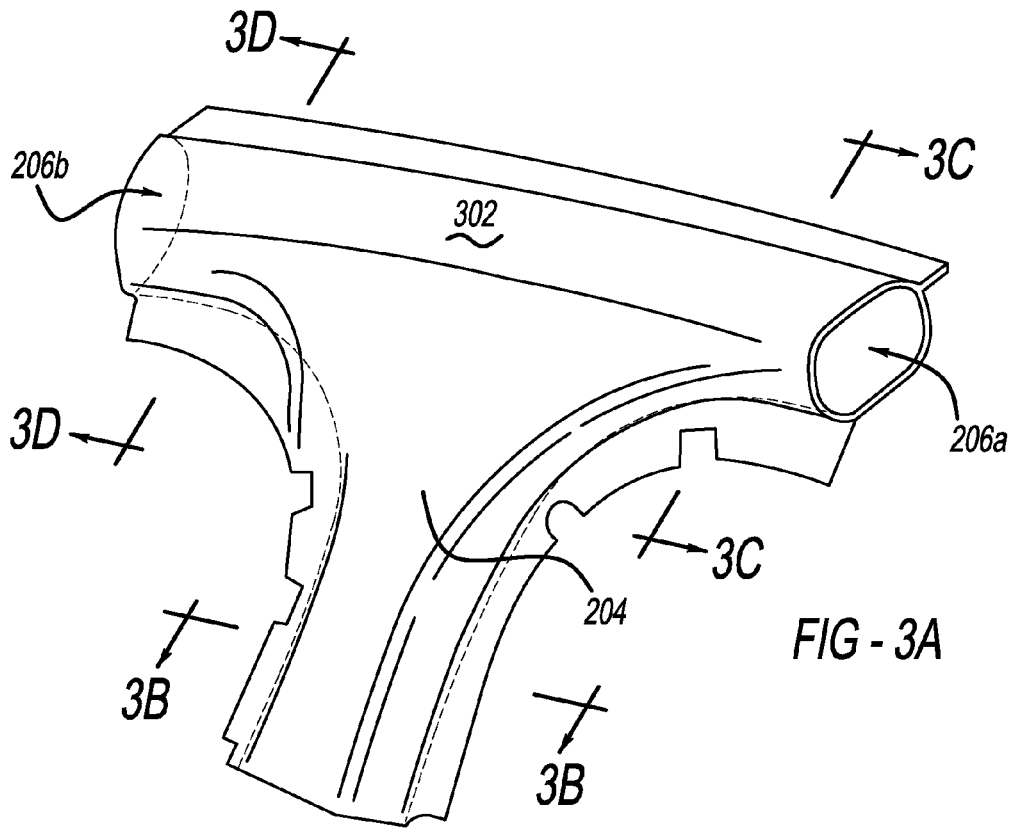
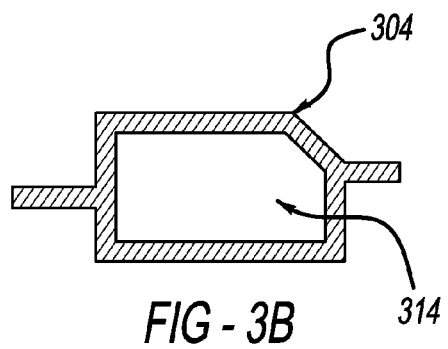
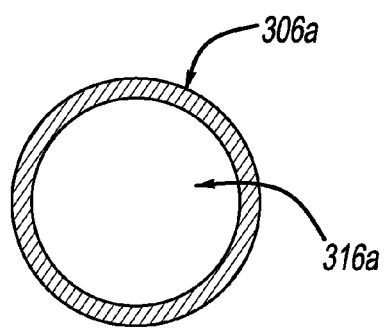
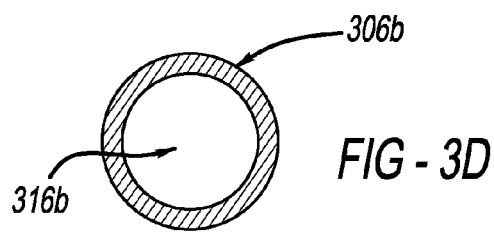

VEHICLE ROOF STRUCTURE INCLUDING A CAST NODE

TECHNICAL FIELD

The disclosed inventive concept relates generally to a cast node for a vehicle roof structure, and in particular a cast node for connecting vehicle B-pillar, two sections of a roof rail, and a roof bow.

BACKGROUND

The roof of a vehicle is in general supported by pillars, commonly known as A-pillar, B-pillar, C-pillar and sometimes D-pillar, and roof rails and roof bows. The pillars are located between the windows and doors of the vehicle. The B-pillar is an important element in determining roof strength and the degree of side impact intrusion.

Certain existing B-pillar roof structures include a B-pillar outer upper bracket and a separate B-pillar inner upper bracket, which together are connected to a roof rail and a roof bow. In this assembly the inner and outer brackets need to be welded. In addition, the roof bow is only connected to the B-pillar inner upper bracket. These result in relatively lower stiffness in the resultant roof structure.

It would thus be advantageous if a vehicle roof structure may be provided to solve one or more of these identified problems.

SUMMARY

The disclosed inventive concept is believed to have overcome one or more of the problems associated with B-pillar roof structures.

The present invention in one or more embodiments provides a vehicle roof structure which includes a cast node including a pillar portion for receiving a pillar and a roof-rail portion for receiving a roof rail, the roof-rail portion having first and second ends, which may include a closed first cross-section and a closed second cross-section, respectively. The closed first cross-section may be different from the closed second cross-section such that the first and second ends are to receive two separate sections of the roof rail of different gauge and/or dimensions.

The pillar portion may have a first longitudinal axis and the roof-rail portion has a second longitudinal axis at an angle relative to the first longitudinal axis.

The roof-rail portion may have an in-between section positioned between the first and second ends, the in-between section has a closed cross-section.

The roof structure may further include an extension leaf adjacent to the roof-rail portion for connecting to a roof bow. The extension leaf may be made integral to the cast node.

The roof-rail portion may be partially free of contact with the roof rail.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein:

FIG. 3A illustratively depicts an alternative enlarged partial view of the roof structure referenced in FIG. 1;

FIG. 3B illustratively depicts a cross-sectional view of the roof structure referenced in FIG. 3A;

FIG. 3C illustratively depicts another cross-sectional view of the roof structure referenced in FIG. 3A; and FIG. 3D illustratively depicts yet another cross-sectional view of the roof structure referenced in FIG. 3A;

DETAILED DESCRIPTION OF ONE OR MORE EMBODIMENTS

Figure 1:
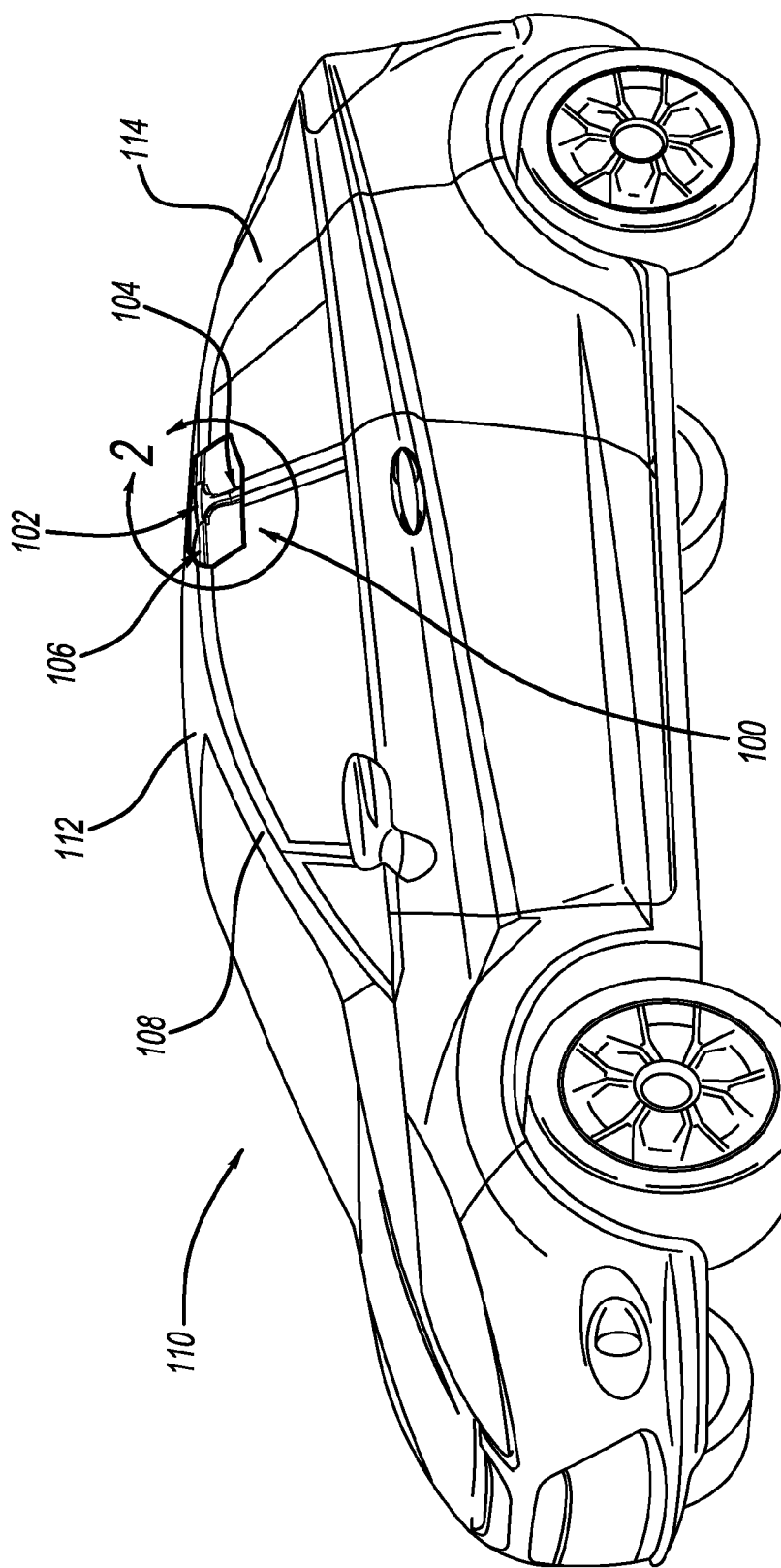
FIG. 1 illustratively depicts a roof structure as positioned in a vehicle according to one or more embodiments of the present invention.

As referenced in the FIG.s, the same reference numerals are used to refer to the same components. In the following description, various operating parameters and components are described for different constructed embodiments. These specific parameters and components are included as examples and are not meant to be limiting.

As will be detailed herein below, the present invention in one or more embodiments is advantageous at least in that a pillar construction such as a B-pillar construction may be provided with relatively enhanced stiffness to enable sturdy connection to a roof rail and a roof bow.

FIG. 1 is a front perspective view of a roof structure generally shown at 100 as positioned in a vehicle 110 according to the present invention in one or more embodiments. The roof structure 100 includes a cast node 102 in connection with a B-pillar 104 and a roof rail 106. The cast node 102 may also be used for connection to an A-pillar 108 and/or a C-pillar 114. For illustration purposes, the case node 102 is described in more details using the B-pillar 104 as a representative of the pillars connectable to the cast node 102.

Figure 2:
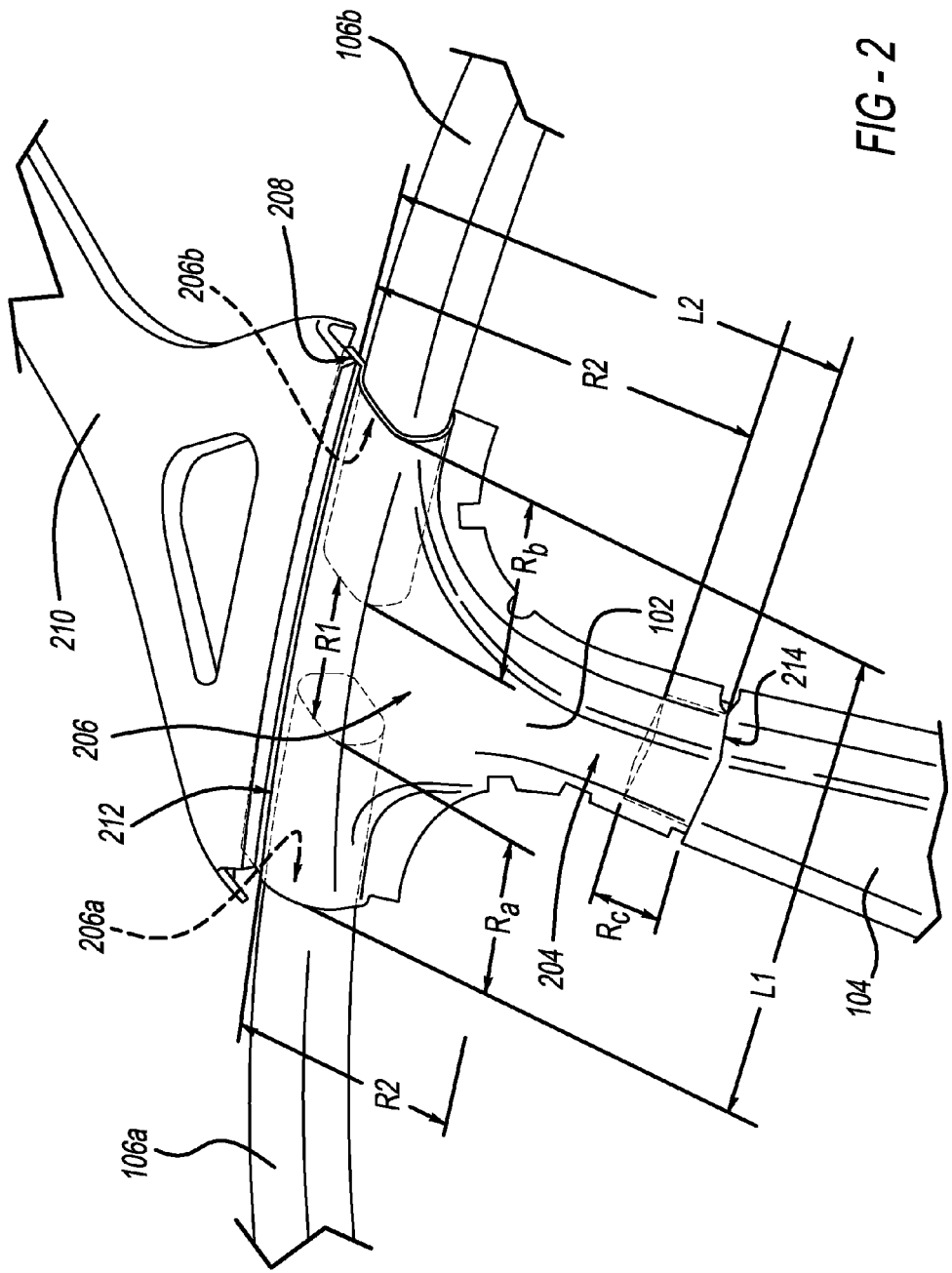
FIG. 2 illustratively depicts an enlarged partial view of the roof structure referenced in FIG. 1.

The roof structure 100 is illustratively depicted in FIG. 2 with more details. The cast node 102 includes a pillar portion 204 for receiving the pillar 104 and a roof-rail portion 206 for receiving the roof rail 106. In certain instances and as illustratively depicted in FIG. 2, the roof rail 106 includes two separate roof rail sections, namely an anterior roof rail 106a and a posterior roof rail 106b, received through a first end 206a and a second end 206b of the roof-rail portion 206, respectively.

Because the cast node 102 may be made as one integral piece via methods such as casting, the first and second ends 206a, 206b may be made of any suitable shapes, any suitable gauge, and of any suitable dimensions. In certain instances, the first end 206a is made with a dimension that is different from that of the second end 206b. When positioned in the vehicle 110, the anterior roof rail 106a may be of higher gauge and/or may be made of a different and stronger material in comparison to the posterior roof rail 106b. In this construction, the needed support is provided via the anterior roof rail 106a while excess material and construction cost may be avoided by providing the posterior roof rail 106b at a posterior area of the vehicle 110 where support is not as acutely required as an interior area of the vehicle 110.

By being an integral one piece in material, the cast node 102 provides another benefit in that the anterior and posterior roof rails 106a, 106b do not need to meet to contact each other. This configuration is illustrated in more details with reference to FIG. 2. The roof-rail portion 206 has a longitudinal dimension L1 defined by the first and second ends 206a, 206b, of which Ra represents the part of L1 taken up by the anterior roof-rail 106a as received within the roof-rail portion 206, Rb represents the part of L1 take up by the posterior roof-rail 106b as received within the roof-rail portion 206, and R1 represents the remainder part of L1 free of either the anterior roof rail 106a or the posterior roof rail 106b. The size of R1 may be varied according to the material and/or size of the anterior roof rail 106a, the posterior roof rail 106b, the pillar 104, and the cast node 102. R1 can be of any suitable non-zero values. In certain instances, R1 is a value greater than 0.5 centimeters.

By the same token, the pillar 104 does not necessarily need to touch a top end 212 of the cast node 102. By illustration, the pillar portion 204 has a longitudinal dimension of L2 defined by the top end 212 and a third end 214, of which Rc represents the part of L2 taken up by the pillar 104 as received within the pillar portion 204, and R2 represents the remainder part of L2 free of the pillar 104. The size of R2 may be varied according to the material and/or size of the anterior roof rail 106a, the posterior roof rail 106b, the pillar 104, and the cast node 102. R2 can be of any suitable non-zero values. In certain instances, R2 is a value greater than 0.5 centimeters.

Referring back to FIG. 2, an extension leaf 208 may be built integral to the cast node 102 and be configured to receive a roof bow 210 of any suitable shape and material. By being integral, the extension leaf 208 may be formed along with the cast node 102 in a casting process. Therefore, the cast node 102 with the extension leaf 208 may be one integral piece by being continuous in material.

FIG. 3A illustratively depicts an alternative perspective view of the case node 102. Several cross-sectional views of the cast node 102 referenced in FIG. 3A are further illustratively depicted in FIG. 3B through FIG. 3D. FIG. 3B illustratively depicts a cross-section of the pillar portion 204 taken along line 3B'-3B. FIG. 3C illustratively depicts a cross-section of the first end 206a taken along line 3C'-3C. FIG. 3D illustratively depicts a cross-section of the second end 206b taken along line 3D'-3D.

The cross-sections depicted in FIG. 3B through 3D can be of any suitable geometric shapes. However, the cross-sections are preferably all closed cross-sections. Alternatively stated, the cross-sections each have a closed-loop outer perimeter with no intentionally created opening or gap in between.

The cast node 102 may be casted into a structure with a continuously hollow interior. The hollow interior may be evidenced by the structures of the cross-sections referenced in FIG. 3B through FIG. 3D.

Referring back to FIG. 3A in view of FIG. 3B, the pillar portion 204 may be configured to include a wall section 304 which defines a cavity 314 contained within. The wall section 304 may be of any suitable thickness, which in turn may vary dependent upon the particular strength of support as needed.

Referring back to FIG. 3A in view of FIG. 3C and FIG. 3D, the roof-rail portion 206 may be configured as hollow structure in a way similar to the pillar portion 204 described herein above. In particular, the roof-rail portion 206 may be visualized to have a wall section 306a which defines a cavity 316a at the first end 206a, and have a wall section 306b which defines a cavity 316b at the second end 206b. The roof-rail portion 206 may be configured to have a cavity 302 continuously along its longitudinal axis L1 from the first end 206a to the second end 206b. Because the cast node 102 may be formed via casting with a core to create the cavity 302, the wall thickness and the cavity dimension along the longitudinal axis L1 may be varied continuously as needed.

The roof rail 104 may be produced using any known methods, a non-limiting example of which being hydro-forming. With hydro-forming, the dimensions of the roof rail can only be varied to a certain degree. What this translates to is that certain existing roof structures can only accommodate a single roof rail spanning the entire anterior to the posterior area of the vehicle. Along the entire length of such roof rail degree of gauge variation is limited by the method of forming, which is hydro-forming. Therefore, to accommodate for the strength requirement for the anterior part of the vehicle, the roof rail is formed with a relatively thick gauge for that part; however, that degree of thickness unnecessarily continues for the posterior part of the roof rail, which results in unnecessary waste in material and excess weight the resultant vehicle.

As described herein, and via the use of the cast node 102, the roof structure 100 does not require welding to connect the pillar 104 with the roof rail 106a, 106b. Accordingly, and by avoiding welding, the structural strength of these components is not or less compromised. This assures the strength of the roof structure 100 in the event that the roof 112 is loaded with a compressive force. The load applied to the roof 112 is transferred from the roof rail 106a, 106b to the pillar 104 maximizing the load carrying capacity of the roof structure 100.

The cast node 102 may be formed by semi-permanent mold sand core casting. In such a method, a core is a shaped body, usually made of sand, which forms the interior part of the casting, like the cavity the pit makes in the flesh of a peach. Cores can take on a variety of angles and shapes, and more than one can be used per casting. Sometimes, an assembly of cores is constructed to create a web of internal passageways and chambers.

Most cores are made of sand, although they also can be made of ceramic or metal. The core acts as a negative, displacing molten metal as it is poured into the casting mold. Following the solidification of the metal, the sand core is shaken out, revealing the void.

In one or more embodiments, the disclosed invention as set forth herein overcomes the challenges faced by known production of roof structure of a vehicle and in particular B-pillar roof structures. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A roof structure of a vehicle, comprising, at an assembled position:
a cast node including a pillar portion contacting a pillar and a roof-rail portion contacting a roof rail, the roof-rail portion having first and second ends and an in-between section positioned there-between, the first end having a closed first cross-section, the in-between section having a closed in-between cross-section with a void center.

2. The roof structure of claim 1, wherein the second end has a closed second cross-section.

3. The roof structure of claim 2, wherein the closed first cross-section is different from the closed second cross-section in dimension.

4. The roof structure of claim 3, wherein the closed first cross-section is larger in opening dimension than the closed second cross-section, when the first end is positioned closer to a front of the vehicle than the second end.

5. The roof structure of claim 1, wherein the pillar portion has a closed third cross-section.

6. The roof structure of claim 1, wherein pillar portion has a first longitudinal axis and the roof-rail portion has a second longitudinal axis at an angle relative to the first longitudinal axis.

7. The roof structure of claim 1, further comprising an extension leaf adjacent to the roof-rail portion for connecting to a roof bow.

8. The roof structure of claim 7, wherein the extension leaf is integral to the cast node.

9. The roof structure of claim 3, wherein the void center of the in-between cross-section of the roof-rail portion is next to the roof rail.

10. The roof structure of claim 1, wherein at a dissembled position prior to contacting the roof rail, the closed first cross-section of the first end defines therein a first cavity, and wherein at the assembled position, the roof rail is partially received within the first cavity.

11. The roof structure of claim 2, wherein at a dissembled position prior to contacting the roof rail, the closed second cross-section of the second end therein a second cavity, and wherein at the assembled position, the roof rail is partially received within the second cavity.

12. A roof structure of a vehicle, comprising:
   a cast node including a pillar portion and a roof-rail portion, the roof-rail portion having first and second ends with closed first and second cross-sections, respectively, and the pillar portion having a third end with a closed third cross-section;
   an anterior roof rail contacting the first end and a posterior roof rail contacting the second end; and
   a pillar contacting the third end, wherein the roof-rail portion further includes an in-between section positioned between the first and second ends and having a closed in-between cross-section with a void center.

13. The roof structure of claim 12, wherein the closed first cross-section is larger in opening dimension than the closed second cross-section, when the first end is positioned closer to a front of the vehicle than the second end.

14. The roof structure of claim 12, further comprising an extension leaf adjacent to the roof-rail portion for connecting to a roof bow.

15. The roof structure of claim 14, wherein the extension leaf is integral to the cast node.

16. The roof structure of claim 12, wherein the void center of the in-between cross-section of the roof-rail portion is at least partially positioned between the anterior and posterior roof rails.

17. The roof structure of claim 12, wherein at a dissembled position prior to receiving the roof rail, the closed first cross-section of the first end defines therein a first cavity, and wherein at the assembled position, the roof rail is partially received within the first cavity.

18. The roof structure of claim 12, wherein at a dissembled position prior to receiving the roof rail, the closed second cross-section of the second end defines therein a second cavity, and wherein at an assembled position, the roof rail is partially received within the second cavity.

19. A method of forming a roof structure of a vehicle, comprising:
   contacting a roof rail and a pillar with a cast node, the cast node including a pillar portion and a roof-rail portion, the roof-rail portion having first and second ends with closed first and second cross-sections, respectively, and the pillar portion having a third end with a closed third cross-section, the roof rail contacting the first end and the pillar contacting the third end, wherein the roof-rail portion further includes an in-between section positioned between the first and second ends and having a closed in-between cross-section with a void center.

20. The method of claim 19, wherein the roof rail is provided to include an anterior roof rail and a posterior roof rail, and the step of contacting includes contacting the anterior roof rail with the first end and contacting the posterior roof rail with the second end, the anterior roof rail being different in dimension than the posterior roof rail.

* * * * *